(12) United States Patent
Pribnow et al.

(10) Patent No.: US 7,475,724 B2
(45) Date of Patent: Jan. 13, 2009

(54) METHOD OF DETERMINING A FLUID INFLOW PROFILE OF WELLBORE

(75) Inventors: Daniel Frederik Christof Pribnow, Rijswijk (NL); Sascha Van Putten, Rijswijk (NL); Eric Pierre De Rouffignac, Rijswijk (NL)

(73) Assignee: Shell Oil Company, Houston, TX (US)

( * ) Notice: Subject to any disclaimer, the term of this patent is extended or adjusted under 35 U.S.C. 154(b) by 107 days.

(21) Appl. No.: 10/584,418

(22) PCT Filed: Dec. 22, 2004

(86) PCT No.: PCT/EP2004/053675

§ 371 (c)(1),
(2), (4) Date: Jun. 23, 2006

(87) PCT Pub. No.: WO2005/064117

PCT Pub. Date: Jul. 14, 2005

(65) Prior Publication Data

US 2007/0158064 A1    Jul. 12, 2007

(30) Foreign Application Priority Data

Dec. 24, 2003    (EP) .................................. 03104972

(51) Int. Cl.
*E21B 47/06* (2006.01)
*E21B 36/04* (2006.01)
*E21B 43/24* (2006.01)

(52) U.S. Cl. .................. 166/250.01; 166/302; 166/369; 166/60

(58) Field of Classification Search ............ 166/250.01, 166/302, 369, 60
See application file for complete search history.

(56) References Cited

U.S. PATENT DOCUMENTS 3,709,032 A * 1/1973 Coles et al. ............... 73/152.13
4,570,715 A   2/1986 Van Meurs et al. ........ 166/302

(Continued)

FOREIGN PATENT DOCUMENTS

DE         10149092         4/2003

(Continued)

OTHER PUBLICATIONS

International Search Report of PCT/EP2004/053675 dated Mar. 15, 2005.

(Continued)

*Primary Examiner*—Shane Bomar (57) ABSTRACT

A method of determining a fluid inflow profile along the length of a permeable inflow region of an underground wellbore comprising:
  transferring heat into or from the permeable inflow region of the wellbore during a well shut period;
  starting production of hydrocarbon fluids via the permeable inflow region;
  measuring substantially simultaneously the temperature of the fluids at various points of the inflow region;
  determining at selected intervals of time after production start up a temperature profile of the inflow region on the basis of the thus measured temperatures; and
  determining a fluid inflow profile of the inflow region on the basis of a comparison of the determined temperature profiles at selected intervals after production start up. The heater cable may have a layer of compacted mineral powder and temperatures may be measured with an optical fiber.

11 Claims, 3 Drawing Sheets

U.S. PATENT DOCUMENTS

| | | | |
|---|---|---|---|
| 4,676,664 A * | 6/1987 | Anderson et al. | 374/136 |
| 5,400,430 A * | 3/1995 | Nenniger | 392/305 |
| 7,093,502 B2 * | 8/2006 | Kupnik et al. | 73/861.29 |
| 2002/0033253 A1 | 3/2002 | de Rouffignec et al. | 166/248 |
| 2003/0140711 A1 | 7/2003 | Brown | 73/861.95 |
| 2008/0065362 A1 * | 3/2008 | Lee et al. | 703/10 |

FOREIGN PATENT DOCUMENTS

| | | |
|---|---|---|
| WO | 99/45235 | 9/1999 |
| WO | 00/11317 | 3/2000 |
| WO | 2004/085795 | 10/2004 |
| WO | 2004/094961 | 11/2004 |

OTHER PUBLICATIONS

R. Miller, et al: "Fiber Opotics, Advanced Technologies Complete ERD Producer/Injector", Oil and Gas Jrnl., Pennwell Publishing Co, vol. 97, No. 27, Jul. 5, 1999, pp. 47-52.

* cited by examiner

METHOD OF DETERMINING A FLUID INFLOW PROFILE OF WELLBORE

The present application claims priority on European Application 03104972.9 filed 24 Dec. 2003.

FIELD OF THE INVENTION

The invention relates to a method of determining a fluid inflow profile along the length of a permeable inflow region of an underground wellbore.

BACKGROUND OF THE INVENTION

Temperature logs have been used for many years in the oil and gas industry to obtain inflow and outflow information of selected intervals. U.S. Pat. No. 4,520,666 discloses a method of determining inflow into a well by determining the temperature in the well along the length of the inflow region by moving a logging sonde which is equipped with a temperature sensor up and/or down through the well inflow region.

More recently fiber optic Distributed Temperature Sensing (DTS) systems have become available to obtain temperature profiles along a well on a permanent basis. International patent application WO 01/04581 discloses the use of a fiber optic DTS sensor to determine the mass flow rates of produced fluids in a wellbore.

The temperature profile in an oil and/or gas production well is based on the difference between the geothermal gradient along the well and the inflowing fluids. In vertical or deviated wells a temperature contrast develops if two or more zones at different depths produce to the well. This temperature contrast is a function of the reservoir depth, the geothermal gradient and the thermal properties of the fluid and the well (casing, cement).

In a horizontal inflow region of an oil and/or gas productions well there is no geothermal gradient along the horizontal section. Differences can only be caused either by cooling due to gas expansion, known as the Joule Thompson effect, which occurs in gas reservoirs or oil reservoirs where gas comes out of solution during production, or when water is produced from a deeper aquifer (potential higher temperature) or from a nearby water injector (potential lower temperature).

International patent application WO 00/11317 and U.S. Pat. No. 6,497,279 disclose methods of monitoring production in an oil production well by means of an electrical heater cable and adjacent fiber optical DTS sensor, wherein the wellbore is heated by the electrical heater cable during production and the fluid flow is determined from the temperature profile measured by the fiber optical DTS sensor on the assumption that the fluid flowing from the formation to the wellbore lowers the temperature in the wellbore at the inflow locations.

US patent application US 2003/0140711 discloses a method for monitoring the velocity of fluids in a well wherein a point near the lower end of the well is cooled during a well shut in and the upward velocity of the cold spot is measured after restarting production by a fibre optical temperature sensing cable that extends along the length of the wellbore.

SUMMARY OF THE INVENTION

The present invention include a method for determining a fluid inflow profile along the length of a permeable inflow region of an underground wellbore comprises the steps of:

transferring heat into or from the permeable inflow region of the wellbore during a well shut in period such that at least a substantial part of the inflow region has a temperature which is different from the temperature of the surrounding formation;

starting production of hydrocarbon fluids via said permeable inflow region;

measuring substantially simultaneously the temperature of the fluids at various points along at least part of the length of the inflow region;

determining at selected intervals of time after production start up a temperature profile along at least part of the length of the inflow region on the basis of the thus measured temperatures; and determining a fluid inflow profile along the length of said inflow region on the basis of a comparison of the determined temperature profiles at selected intervals after production start up, wherein at least a substantial part of the permeable inflow region is heated during the well shut-in period and wherein during an initial period of time after starting production of hydrocarbons via said permeable inflow region heating of the permeable inflow region is continued and wherein during a subsequent period of time following said initial period heating of the permeable inflow region is interrupted, and the temperature is measured both during said initial and subsequent periods of time and wherein differences between the temperature variation over time measured during said initial and subsequent period are used to determine a heat capacity of the inflowing fluid.

The level of temperature variation per unit of time, such as the local heat up or cool down rate, may be used as an indicator of the level of influx of fluid at various points along the length of said inflow region.

In case during a shut in, when no fluids flow into the well, a well inflow region is heated by an electrical heater cable which has a substantially constant electrical resistance along the length of the heated section this will result in an substantially constant increase in well temperature over time along the heated section. When the well is put back on production the zones with relatively high flow rates will cool down to reservoir temperature faster than zones with no or little fluid flow.

Accordingly, the inflow profile may be determined such that if at a specific location the measured temperature variation over time is higher than at adjacent locations along the length of the permeable inflow region the thus measured peak in the temperature variation per unit of time is used as an indicator that at said specific location the influx of fluids is higher than at said adjacent locations, whereas if at another specific location the measured temperature variation per unit of time is lower than at adjacent locations along the length of the permeable inflow region the thus measured dip in the temperature variation per unit of time is used as an indicator that at said other specific location the influx of fluids is lower than at said adjacent locations.

In the method according to the invention a ratio of the temperature variation over time measured during the initial period and during the subsequent period is determined for various points along the length of the inflow region and said ratio is used as an indicator of the heat capacity of the fluid flowing into the well. More particularly, a relatively high ratio between the temperature variation measured during the initial and subsequent periods may be used as an indicator that the inflowing fluid has a relatively low heat capacity and a relatively high gas content.

The permeable inflow region may be heated by an electrical heater cable extending along at least a substantial part of the length of the permeable inflow region and the temperature may be measured by means of a fiber optical distributed temperature sensor (DTS) extending along at least a substantial part of the length of the permeable inflow region.

The fiber optical distributed temperature sensor (DTS) may be strapped to the outer surface of the electrical heater cable.

Alternatively, the electrical heater cable may comprise an electrical conductor, which is surrounded by a mineral insulation layer comprising a compacted mineral powder, which is enclosed in an annular metal sheath, and the fiber optical sensor is embedded in a channel extending through the mineral insulation layer.

The invention also relates to a method of producing crude oil from a subterranean formation, wherein the influx of crude oil and/or other fluids into the well is determined and/or adjusted to an optimal level on the basis of the method according to the invention.

The invention furthermore relates to heater and distributed temperature sensing (DTS) system suitable for use in the method according to the invention. The system comprises one or more mineral insulated heater cables, which each comprise an electrical conductor which is surrounded by a mineral insulation layer comprising an compacted mineral powder, which layer is enclosed in an annular metal sheath, and a fiber optical distributed temperature sensor which extends along at least a substantial part of the length of one or more mineral insulated heater cables.

Optionally at least one fiber optical distributed temperature (DTS) sensor extends through a channel extending through the mineral insulation layer of at least one of the mineral insulated heater cables.

BRIEF DESCRIPTION OF THE DRAWINGS

The method according to the invention will be described in more detail with reference to the accompanying drawings in which.

DETAILED DESCRIPTION

Figure 1:
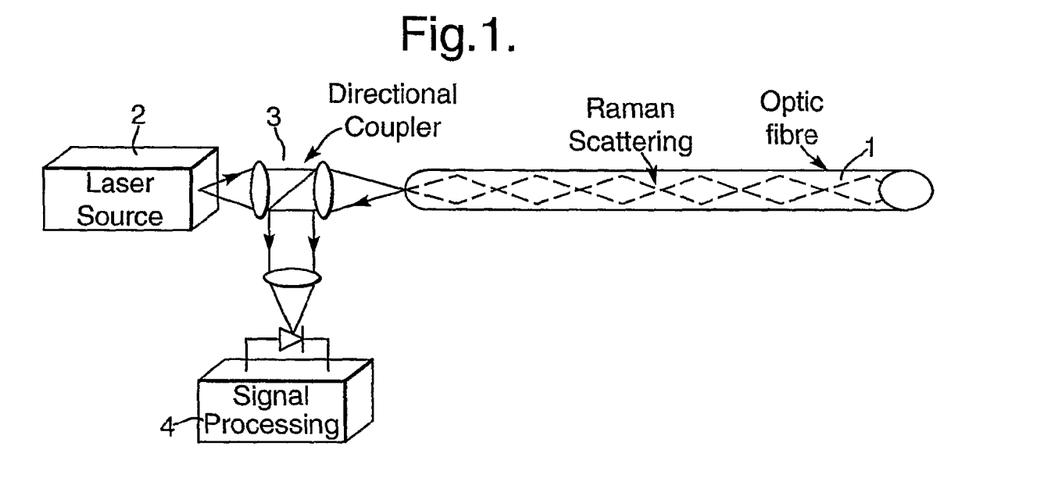
FIG. 1 illustrates a suitable configuration of a Distributed Temperature Sensing (DTS) optical fiber assembly.

Distributed Temperature Sensing (DTS) with optical fibers is based on optical time-domain reflectometry. FIG. 1 illustrates the principle of DTS operation. A pulsed laser 2 is coupled to an optical fiber 1 that is the sensing element. The light is backscattered as the pulse propagates through the fiber 1 owing to density and composition as well as to molecular and bulk vibrations. A portion of the backscattered light is guided back to the light source 2 and split of by a directional coupler 3 to a receiver 4. Under ideal conditions the intensity of the backscattered light decays exponentially with time. As the speed of light within the fiber 1 is known, the distance that the light has passed through the fiber 1 can be derived from the time along the decay curve.

Figure 2:
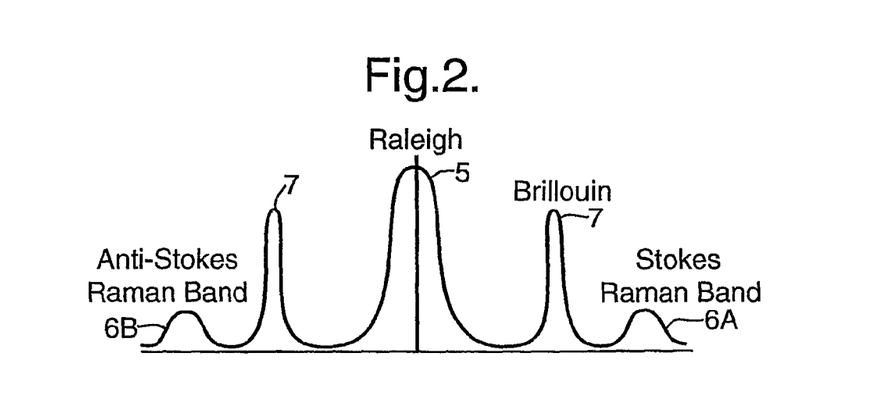
FIG. 2 shows a typical spectrum of light backscattered from different points along the length of the fiber, which spectrum carries information about the temperature along the length of the fiber.

FIG. 2 illustrates that the backscattered light includes different spectral components which contain peaks that are known as Rayleigh and Brillouin peaks and Raman bands. The Rayleigh peak 5 is independent of temperature but is useful in identifying breaks and inhomogeneities along the fiber. The Raman spectral bands 6 are caused by thermally influenced molecular vibrations. These are naturally occurring phenomena in glass as well as in fluids, gases and solids. The Raman spectral bands 6 can be used to obtain information about distribution of temperature along the well.

The Raman backscattered light has two components, Stokes 6A and Anti-Stokes 6B, one being only weakly dependent on temperature and the other being greatly influenced by temperature. The relative intensities between the Stokes and Anti-Stokes components 6A and 6B are a function of temperature at which the backscattering occurred. Therefore, temperature can be determined at any point along the length of the optical fiber 1 by comparing at each point the Stokes and Anti-stokes components 6A and 6B of the light backscattered from the particular point. The Brillouin peaks 7 may be used to monitor strain along the length of the optical fiber 1.

The level of temperature variation per unit of time, such as the local heat up or cool down rate, may used as an indicator of the level of influx of fluid at various points along the length of said inflow region.

In case during a shut in, when no fluids flow into the well, a well inflow region is heated by an electrical heater cable which has a substantially constant electrical resistance along the length of the heated section this will result in an substantially constant increase in well temperature over time along the heated section. When the well is put back on production the zones with relatively high flow rates will cool down to reservoir temperature faster than zones with no or little fluid flow.

Accordingly, the inflow profile may be determined such that if at a specific location the measured temperature variation over time is higher than at adjacent locations along the length of the permeable inflow region the thus measured peak in the temperature variation per unit of time is used as an indicator that at said specific location the influx of fluids is higher than at said adjacent locations, whereas if at another specific location the measured temperature variation per unit of time is lower than at adjacent locations along the length of the permeable inflow region the thus measured dip in the temperature variation per unit of time is used as an indicator that at said other specific location the influx of fluids is lower than at said adjacent locations.

In the method according to the invention a ratio of the temperature variation over time measured during the initial period and during the subsequent period is determined for various points along the length of the inflow region and said ratio is used as an indicator of the heat capacity of the fluid flowing into the well. More particularly, a relatively high ratio between the temperature variation measured during the initial and subsequent periods may be used as an indicator that the inflowing fluid has a relatively low heat capacity and a relatively high gas content.

The permeable inflow region may be heated by an electrical heater cable extending along at least a substantial part of the length of the permeable inflow region and the temperature may be measured by means of a fiber optical distributed temperature sensor (DTS) extending along at least a substantial part of the length of the permeable inflow region.

The fiber optical distributed temperature sensor (DTS) may be strapped to the outer surface of the electrical heater cable.

Alternatively, the electrical heater cable may comprise an electrical conductor, which is surrounded by a mineral insulation layer comprising a compacted mineral powder, which is enclosed in an annular metal sheath, and the fiber optical sensor is embedded in a channel extending through the mineral insulation layer.

Figure 3:
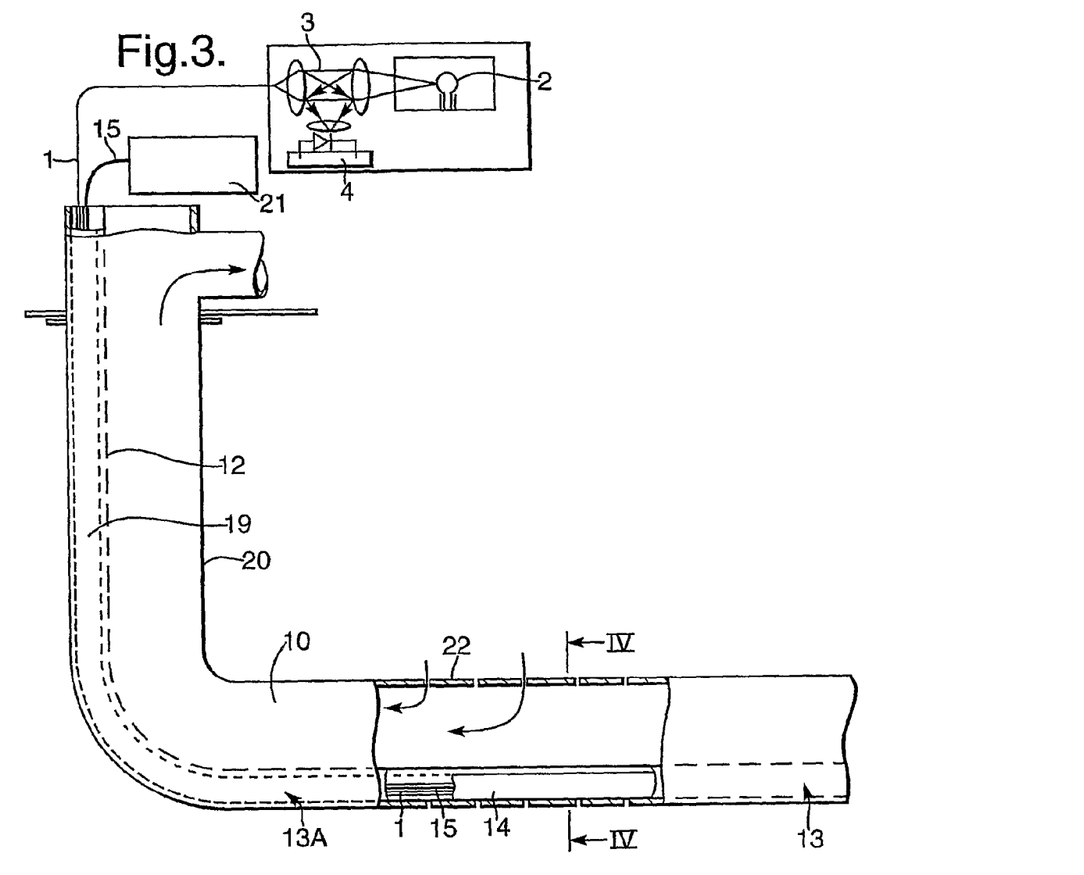
FIG. 3 is a schematic longitudinal sectional view of an oil and/or gas production well in which a MI heater cable with integrated DTS optical fiber assembly is arranged.

FIG. 3 shows how an optical DTS fiber 1 is arranged in the horizontal inflow region 10 and the vertical riser section of a well 11. The well 11 is equipped with a 0.6 cm (¼ inch) OD control line 12 through which a Mineral Insulated (MI) heater cable 13 and lead in cable 19 extend. This control line 12 may be installed either outside or inside the well casing 20, liners and/or perforated sandscreen 22 in the horizontal inflow region 10 of the well 11. Electrical power is supplied to the lead in cable 19 by an electrical power supply source 21. Pulsed laser light signals are supplied to the optical fiber 1 by the laser light source 2 and the light spectrum backscattered from different points along the length of the optical fiber 1 is reflected by a directional coupler 3 to a receiver 4. The receiver 4 is equipped with a light processing unit in which in particular the Stokes and anti-Stokes Raman bands 6A and 6B of the backscattered light are converted into a signal which is related to the temperature of the optical fiber 1 at the point where the light pulse has been reflected in accordance with the description provided with reference to FIGS. 1 and 2.

Figure 4:
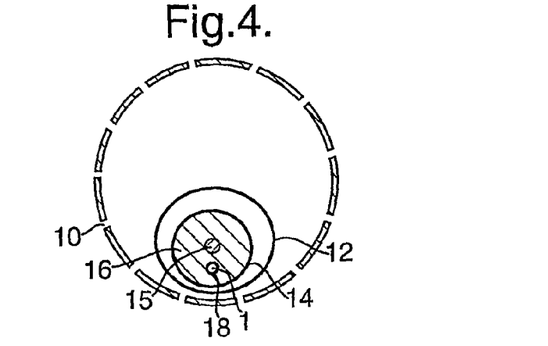
FIG. 4 is a cross-sectional view, at an enlarged scale, of the horizontal inflow region and MI heater cable with integrated DTS optical fiber assembly taken along line IV-IV in FIG. 3 and seen in the direction of the arrows.

The mineral insulated (MI) heater cable 13 is made up of an outer metal sheath 14, usually cylindrical, that contains a concentric solid metal rod 15. The annular space between the sheath 14 and the metal rod 15 is filled with an insulant 16, usually in powder form, that is a good electrical insulator and a reasonable thermal conductor. The metal rod 15 or core is used to conduct a current, usually AC, which generates heat by ohmic dissipation. The MI heater cables 13 may be operated under DC conditions or under AC single-phase or AC three-phase conditions. The length of the MI heater cables 13 can vary from 15 to 1000 m. For monitoring influx into an oil production well a suitable length along with the well inflow region is heated may be about 250 m.

The MI heater cable 13 may be configured to deliver between 0 and 1 KW/m with larger powers easily achieved for shorter heater cables. The power level is such that the core temperature must not exceed a maximum value related to the breakdown strength of the insulant 16 and the sheath temperature must not exceed a maximum temperature related to the corrosion resistance of the sheath alloy. This means that the core temperature is in the 650 to 870 Degrees Celsius (1200° F. to 1600° F.) range and the sheath temperature in the 540 to 760 Degrees Celsius (1000° F. to 1400° F.) range.

The heater assembly may consist of one or multiple MI heater cables 13 placed in the well. The heater(s) can support its (or their) own weight if the sheath temperature is less than 540 Degrees Celsius (1000° F.). This temperature could be higher with more creep resistant alloys. The MI heater cables 13 can also be strapped to a support tube or support cable. A suitable mode is to have three heater cables strapped to a support and operated with 60-cycle AC voltage in a three-phase Y configuration.

The DTS optical fiber 1 may extend through a channel 18 in the insulant 16 of a MI heater cable 13 as illustrated in FIGS. 3 and 4 or may be installed separately from the MI heater cable or cables 13, such as by strapping a guide tube containing the fiber 1 to the outer surface of MI heater cable 13 or to the support tube or support cable. The guide tube may be U-shaped such that a double-ended optical fiber can be injected into the guide tube after installation of the guide tube in the well 11 and/or to replace a damaged optical fiber 1.

The heater assembly is configured such that the voltage between the central metal rod 15 and sheath 14 is substantially below the breakdown voltage of the insulant 16 at the expected operating temperature of the heater. The sheath alloy has to have a low enough corrosion rate such that a substantially low fraction of its thickness is negatively affected by corrosion over the lifetime required of the heater. The mechanical strength of the heater assembly is sufficient to avoid elongation damage to the MI heater cables 13 when suspended vertically in the well. For most of the applications in DTS measurements these conditions should be satisfied. Suitable embodiments for the various components of the MI heater cable 13 are described in more detail below.

The sheath 14 is a metallic tubular that forms the outer part of the MI heater cable 13. The sheath 14 material will be in contact with formation fluids. Its metallurgy has to be good enough to resist corrosion in the heated formation environment. Alloys that can be used in the temperature range indicated include SS 304, SS 310, Incoloy 800 and Inconel 600.

The sheath 14 as well as the cold pins and the splices described below are devoid of holes that might allow moisture into the insulant 16. Excessive moisture in the insulant 16 can lead to a drop in insulant resistivity and/or a chemical change leading again to a drop in resistivity.

The metal rod 15 is configured to deliver the appropriate power. A given heater can have one or more metal rods 15 within a single sheath 14 and one or more than one heater can be strapped together in a bundle within a well. The power dissipation required per conductor is equal to the total power dissipation per well divided by the total number of conductors. In a suitable configuration three single conductor MI heater cables 13 are strapped to a support member (not shown). The metal rods 15 of the MI heater cables 13 have a diameter and a resistivity at operating temperature that satisfies Ohm's law for the chosen power dissipation per foot, the length of the heater and the maximum voltage allowed. Materials that can be used for the metal rods 15 include nichrome, nickel, and a number of alloys made from copper and nickel in increasing nickel concentrations from pure copper to Alloy 30, Alloy 60, Alloy 180 and Monel. Nickel-copper alloys are preferred because they have a lower temperature resistivity coefficient than the pure metals. A preferred material is Alloy 60. If high power dissipation is required for shorter length heaters a Nichrome core can be used.

The insulant 16 may comprise a variety of materials such as powdered oxides that offer high breakdown strength and high resistivity at the target temperature. The commonly used powders include MgO, $AL_2O_3$, Zirconia, BeO and different chemical variations of Spinels. A preferred material is MgO. Breakdown voltage and resistivity are affected by the type and quantity of impurities in the powders and by the porosity of the powder in the finished heater product. These characteristics also depend on the method used to fabricate the heater. Different methods and different insulants 16 may be selected depending on the required temperature and electrical operating characteristics of the MI heater cable 13. To avoid damage to the MI heater cable 13 at any hot spots it is preferred that the finished MI heater cable 13 is configured to withstand at least 2-3 times the operating voltage at the operating temperature. Preferably, the MI heater cable 13 is configured withstand 1000 VAC at the maximum temperature expected in the well.

Preferred mineral powders for use in the insulant 16 are the "H" mix powder manufactured by Idaho Laboratories Corporation and the Standard MgO powder used by Pyrotenax Cable Company for high temperature applications.

The heated section of the heater is normally connected to a lead-in cable 19 that penetrates the overburden. The MI heater cable 13 operates at the maximum temperature required for the DTS measurements while the lead-in cable 19 is normally rubber insulated and cannot exceed about 65 Degrees Celsius (150° F.) (although more expensive lead-in options can be used either rubber insulated or made from MI cable also). An economic solution is to place a short transition section 13A of MI cable 13 between the heated section and the lead-in cable. This transition section 13A of MI cable 13 is made from a less resistive core than the heated section in order to decrease the power dissipation along its length and therefore lower its temperature. Alloys of the type listed above can be used with varying diameters and the cold pin lengths can vary from 1.5 to 15 m. A preferred mode is a 10 m cold pin filled with the same insulant 16 as the heated section. A suitable sheath for the cold pin is Inconel 600. To inhibit chloride corrosion cracking in the cold-pin region the sheath 16 of the transition section may comprise Inconel 600 for corrosion protection of this type. In addition to cold-pins at the top one might elect to also place cold-pins at the end of the heated section. This can make the bottom termination easier to manufacture but adds cost.

The transition from the heated section to the cold pin has to withstand a temperature equal to half of the target zone operating temperature at the required operating voltage. The final density of the insulant in the splice has to be high enough for this purpose. Preferably the splice is configured to withstand 1000 VAC at 480 Degrees Celsius (900° F.). High temperature splices are made by different manufacturers, such as Idaho Laboratories Corporation or Pyrotenax Cable Company.

The end of the cold-pin may be connected to a long length of flexible rubber insulated copper conductor. The connection may be a standard epoxy filled small canister made by the major heater suppliers. This cable is very similar to typical downhole electrical submersible pump (ESP) cable. Its main characteristic has to be the ability to withstand maximum overburden temperatures and be impermeable to the fluid environment in the well.

The heater assembly can be made such that one has one or several cables powered in parallel with the ends of the cables all at the top. This option called the "hair-pin" option does not require a bottom termination.

If the heater assembly consists of one or more MI heater cables 13 in the 3-phase Y configuration they can be used with no connection at the bottom or with all three-phase cores connected at the bottom. This last option is preferred. This connection can be made directly at the end of the heated section or at the end of cold-pins attached to the end of the heated section, similarly to the top cold-pins. A preferred mode is to use bottom cold-pins with the three-phase conductors electrically connected at the end of the bottom cold-pins. This connection is made within an MgO filled and sealed can or with an epoxy filled can. A preferred mode is an MgO filled can using the same MgO as the one used in the heated section. The final choice of termination will depend on the space available within the well 11 in addition to the DTS fiber 1 installed. A suitable MI heater cable configuration is disclosed in International patent application WO 0183940.

A suitable operational procedure to obtain a quantitative multi-phase inflow distribution with a Distributed Temperature System (DTS) optical fiber 1 in combination with a heater assembly comprising one or more MI heater cables 13 comprises the following five steps:

1. Obtain a steady-state temperature profile under producing conditions.

2. Shut the well and again obtain a steady-state temperature profile. This profile is representative for the geothermal gradient and is referred to as a base line temperature profile.

3. Heat the well at a specified power input and obtain a steady-state temperature profile. The transient behaviour and the time it takes to get from step 2 to 3 allows the heat properties in the system to be determined.

4. Put the well back under producing condition with the heater still on. Obtain a steady-state temperature profile.

5. Turn off the heater and obtain a steady state temperature profile (the same as the temperature profile in step 1. The transient behaviour and the time it takes to get from step 4 to 5 can be used to determine an inflow distribution for the different phases.

Steps 1 and 2 form part of the known procedure for obtaining temperature data with DTS in order to obtain a qualitative "single-phase" (total liquid) inflow distribution.

Steps 3 to 5 are the additional steps required to go from a qualitative to a quantitative multi-phase measurement with the use of a heater.

Figure 5:
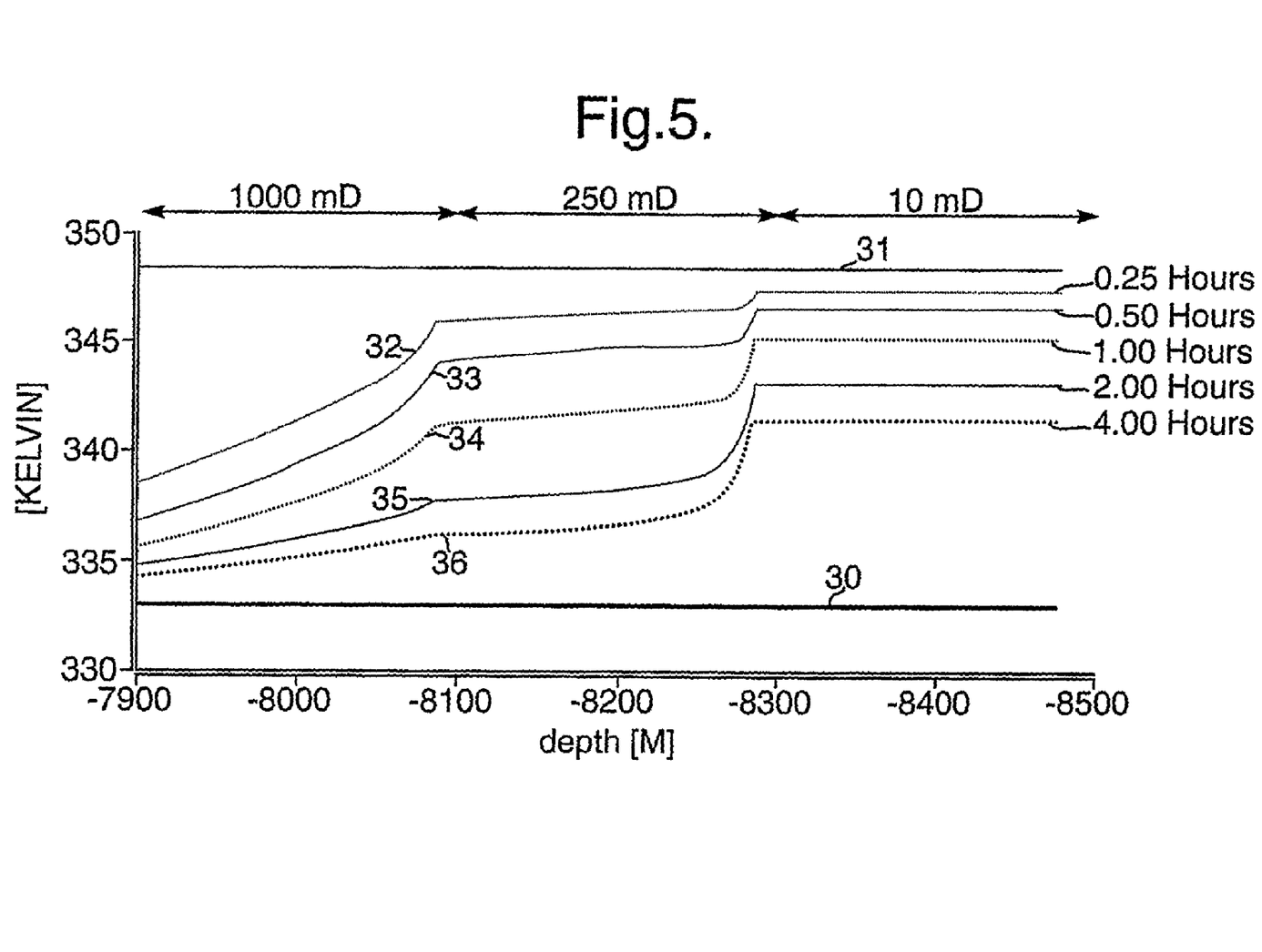
FIG. 5 is a graph which illustrates the results of a simulated application of the method according to the invention in an oil and/or gas production well, which has an inflow region where the surrounding oil/and or gas reservoir has three zones of different permeability.

Simulations of the method according to the invention have been carried out with a thermal reservoir model. In FIG. 5, simulated results are shown for a well with a horizontal section of 600 meters. The horizontal section has been subdivided into three areas with different reservoir characteristics, i.e. different permeabilities of 10, 250 and 100 mD, respectively. Thus, the reservoir has a decreasing permeability along the well.

The lower horizontal line 30 shows the temperature profile of a well that is shut-in just before the heater is activated. The upper horizontal line 31 shows the temperature profile after 48 hour of heating up the well with 90 W/m (So about 60 kW for the whole horizontal sections). After 48 hours the heater is turned off and the well is put on production. The rest of the temperature profiles 32-36 show the temperature response over time. The time it takes for the well to cool down to the temperature profile 37 prior to shut-in can be correlated to the inflow from the reservoir.

A physical model that demonstrates that the method according to the invention can be used to estimate the velocities and/or composition, such as the watercut, of the fluids flowing into the well is as follows.

If a fluid is not in thermal equilibrium with the porous medium it is flowing through, heat will either be extracted or provided to the medium. The temperature of the moving fluid changes corresponding to the temperature of the porous medium and depending on its heat capacity. The basic equation is $$\nabla(\nabla T) - \frac{(\rho \cdot c)_f}{\lambda} \cdot \nabla(\vec{v} \cdot T) = 0 \quad (1)$$

where $\nabla$ is the spatial derivative, T is temperature, $\rho$ is density and c is heat capacity of the fluid, $\lambda$ is thermal conductivity of the saturated medium, and $\vec{v}$ is the Darcy velocity of the fluid, which can be translated into the actual flow velocity $\vec{V}$ by $$\vec{V} = \frac{\vec{v}}{\phi} \qquad (2)$$

where $\phi$ is the porosity.

For one spatial component, e.g. the vertical direction z, the analytic solution to equation (1) is $$T = T_0 + (T_L - T_0) \cdot \frac{\exp\left\{\frac{z \cdot Pe}{L}\right\} - 1}{\exp\{z \cdot Pe\} - 1} \qquad (3)$$

where $T_0$ is the temperature at z=0, $T_L$ is the temperature at z=L, L is the section of interest, and Pe is the Peclét number, defined as the ratio of convective to conductive heat flow $$Pe = \frac{(\rho \cdot c)}{\lambda} \cdot L \cdot v_z \qquad (4)$$

where $v_z$ is the vertical component of $\vec{v}$.

Integration of equation (1) with respect to z and evaluating the undetermined constant at z=0 (where $T=T_0$) yields $$\frac{\partial}{\partial z} T = \frac{Pe}{L} \cdot (T - T_0) + \left. \frac{\partial}{\partial z} T \right|_{z=0} \qquad (5)$$

For the other spatial components, x and y, the calculations are accordingly.

Therefore, determining Pe from the slope of a temperature gradient versus temperature plot (and assuming a value for L) allows to relate thermal measurements directly to fluid velocities with equation (4).

The derived Darcy velocity is directly dependent on the heat capacity of the fluid. The values for water and oil are 4.0 kJ kg−1 K−1 and 1.8 kJ kg−1 K−1, respectively. This means that for a certain Peclet number the uncertainty for the derived Darcy velocity is ±26% if the water cut is not known. On the other hand, if the flow rate is known the Peclét number can be used to estimate the water cut.

The Peclét number analysis is only capable to provide an estimate (limited to one-dimensional flow) of the flow rate. Numerical modelling of coupled heat- and fluid-flow and fitting the acquired data is a more appropriate evaluation approach.

High-resolution temperature measurements over time have been used in geothermal studies to quantify water flow in the formation (assuming there is no flow in the well during the measurement). Thermal recovery of a well after drilling operations, which is equivalent to monitoring the well temperature during shut-in after production or heating, allowed to identify fractured zones and characterize formation layers with different permeability. The Peclét number analysis may be used to derive natural flow velocities in the formation. Again, temperatures may be measured after thermal equilibrium of the well and in the absence of flow in the well. Any flow in the well will dominate over the thermal signal from the formation.

Some embodiments of the inventions also relate to a method of producing crude oil from a subterranean formation, wherein the influx of crude oil and/or other fluids into the well is determined and/or adjusted to an optimal level on the basis of the method according to the invention.

Some embodiments of the inventions furthermore relate to heater and distributed temperature sensing (DTS) system suitable for use in the method according to the invention. The system comprises one or more mineral insulated heater cables, which each comprise an electrical conductor which is surrounded by a mineral insulation layer comprising an compacted mineral powder, which layer is enclosed in an annular metal sheath, and a fiber optical distributed temperature sensor which extends along at least a substantial part of the length of one or more mineral insulated heater cables.

Optionally at least one fiber optical distributed temperature (DTS) sensor extends through a channel extending through the mineral insulation layer of at least one of the mineral insulated heater cables.

We claim:

1. A method of determining a fluid inflow profile along the length of a permeable inflow region of an underground wellbore, the method comprising the steps of:
   transferring heat into or from the permeable inflow region of the wellbore during a well shut in period such that at least a part of the inflow region has a temperature which is different from the temperature of the surrounding formation;
   starting production of hydrocarbon fluids via said permeable inflow region;
   measuring substantially simultaneously the temperature of the fluids at various points along at least part of the length of the inflow region; and
   determining at selected intervals of time after production start up a temperature profile along at least part of the length of the inflow region on the basis of the thus measured temperatures;
   wherein the method further comprises determining a fluid inflow profile along the length of said inflow region on the basis of a comparison of the determined temperature profiles at selected intervals after production start up, wherein during an initial period of time after starting production of hydrocarbons via said permeable inflow region said heat transfer into or from the permeable inflow region is continued and wherein during a subsequent period of time following said initial period said heat transfer is interrupted, and the temperature is measured both during said initial and subsequent periods of time and wherein differences between the temperature variation over time measured during said initial and subsequent period are used to determine a heat capacity of the inflowing fluid.

2. The method of claim 1, wherein a comparison of the temperature profiles determined at the selected intervals is used as an indicator of the level of influx of fluid at various points along the length of said inflow region.

3. The method of claim 2, wherein the inflow profile is determined such that if at a specific location the measured temperature variation over time is higher than at adjacent locations along the length of the permeable inflow region the higher temperature variation per unit of time is used as an indicator that at said specific location the influx of fluids is higher than at said adjacent locations, whereas if at another specific location the measured temperature variation per unit of time is lower than at adjacent locations along the length of the permeable inflow region the lower temperature variation per unit of time is used as an indicator that at said other specific location the influx of fluids is lower than at said adjacent locations.

4. The method of claim 1, wherein a ratio of the temperature variation over time measured during the initial period and during the subsequent period is determined for various points along the length of the inflow region and wherein said ratio is used as an indicator of the heat capacity of the fluid flowing into the well.

5. The method of claim 4, wherein a relatively high ratio between the temperature variation measured during the initial and subsequent periods is used as an indicator that the inflowing fluid has a relatively low heat capacity and a relatively high gas content.

6. The method of claim 1, wherein the permeable inflow region is heated by an electrical heater cable extending along at least a part of the length of the permeable inflow region and wherein the temperature is measured by means of a fiber optical temperature sensor extending along at least a part of the length of the permeable inflow region.

7. The method of claim 6, wherein the fiber optical temperature sensor is strapped to the outer surface of the electrical heater cable.

8. The method of claim 6, wherein the electrical heater cable comprises an electrical conductor which is surrounded by a mineral insulation layer comprising a compacted mineral powder, which layer is enclosed in an annular metal sheath, and the fiber optical sensor is embedded in a channel extending through the mineral insulation layer.

9. A method of producing crude oil from a subterranean formation, wherein the influx of fluids into the well is determined or adjusted to an optimal level on the basis of the method, comprising the steps of:
    transferring heat into or from the permeable inflow region of the wellbore during a well shut in period such that at least a part of the inflow region has a temperature which is different from the temperature of the surrounding formation,
    starting production of hydrocarbon fluids via said permeable inflow region,
    measuring substantially simultaneously the temperature of the fluids at various points along at least part of the length of the inflow region; and
    determining at selected intervals of time after production start up a temperature profile along at least part of the length of the inflow region on the basis of the thus measured temperatures;
    wherein the method further comprises determining a fluid inflow profile along the length of said inflow region on the basis of a comparison of the determined temperature profiles at selected intervals after production start up, wherein during an initial period of time after starting production of hydrocarbons via said permeable inflow region said heat transfer into or from the permeable inflow region is continued and wherein during a subsequent period of time following said initial period said heat transfer is interrupted, and the temperature is measured both during said initial and subsequent periods of time and wherein differences between the temperature variation over time measured during said initial and subsequent period are used to determine a heat capacity of the inflowing fluid.

10. A heater and distributed temperature sensing system comprising:
    means for transferring heat into or from a permeable inflow region of the wellbore during a well shut in period such that at least a part of the inflow region has a temperature that is different from the temperature of the surrounding formation;
    means for producing hydrocarbon fluids via said permeable inflow region;
    means for measuring substantially simultaneously the temperature of the fluids at various points along at least part of the length of the inflow region;
    means for determining at selected intervals of time after production start up a temperature profile along at least part of the length of the inflow region on the basis of the thus measured temperatures;
    means for controlling said heat transfer means, said producing means, said temperature measuring means, and said temperature profile determining means such that a fluid inflow profile along the length of said inflow region is determined on the basis of a comparison of the temperature profiles determined at selected intervals after production start up, such that at least a part of the permeable inflow region is heated during the well shut-in period, such that during an initial period of time after starting production of hydrocarbons via said permeable inflow region said heat transfer into or from the permeable inflow region is continued and during a subsequent period of time following said initial period said heat transfer is interrupted, and such that the temperature is measured both during said initial and subsequent periods of time and differences between the temperature variation over time measured during said initial and subsequent period are used to determine a heat capacity of the inflowing fluid; and
    one or more mineral insulated heater cables, which each comprise an electrical conductor surrounded by a mineral insulation layer comprising an compacted mineral powder, which layer is enclosed in an annular metal sheathe; and
    a fiber optical distributed temperature sensor extending along at least a part of the length of one or more mineral insulated heater cables.

11. The heated and distributed temperature sensing system of claim 10, wherein at least one fiber optical distributed temperature sensor extends through a channel extending through the mineral insulation layer of at least one of the mineral insulated heater cables.

* * * * *